UNITED STATES PATENT OFFICE.

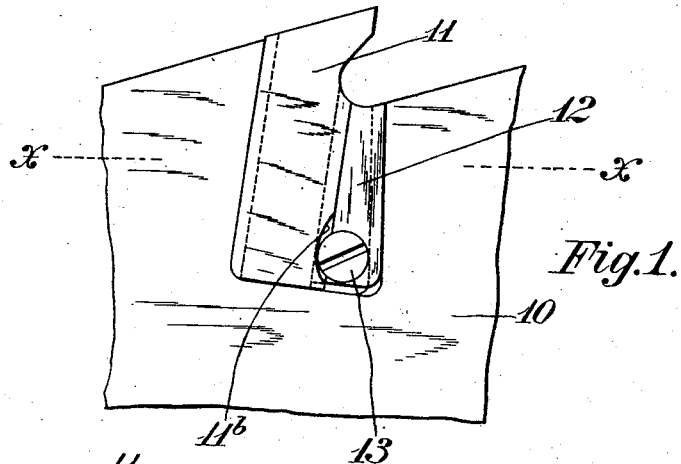
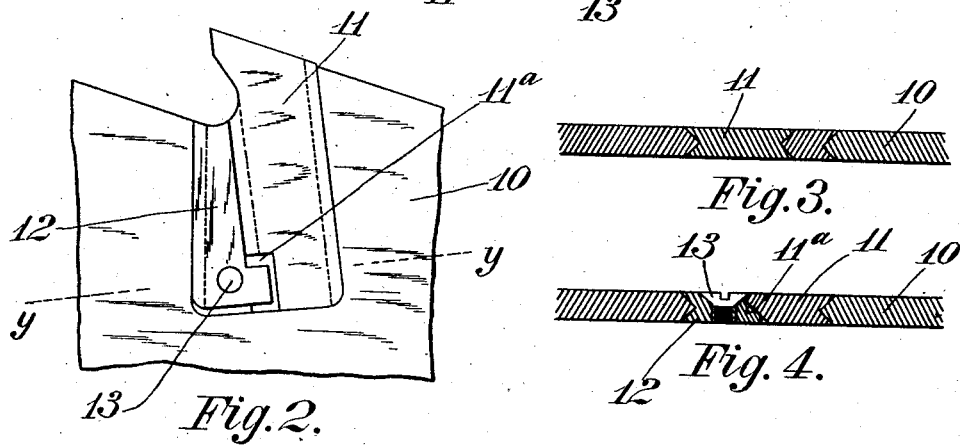

ANDREW KRIEGER, OF COLUMBUS, OHIO.

DETACHABLE SAW-TOOTH.

1,048,181.  Specification of Letters Patent.  Patented Dec. 24, 1912.

Application filed June 12, 1912. Serial No. 703,115.

*To all whom it may concern:*

Be it known that I, ANDREW KRIEGER, a citizen of the United States, residing at Columbus, in the county of Franklin and State of Ohio, have invented a certain new and useful Improvement in Detachable Saw-Teeth, of which the following is a specification.

The object of this invention is an improved means for securing a detachable saw tooth whereby although the tooth is securely held for the purpose of performing its ordinary function it can be readily removed for repair or substitution when damaged.

The invention is embodied in the construction herein shown and described and then particularly pointed out in the claims.

In the accompanying drawings—Figure 1 is a side elevation of a fraction of a saw body showing a tooth and means for securing the same therein according to my invention, the wedge shown being in front of the tooth. Fig. 2 is a similar elevation of the side opposite that shown in Fig. 1. Fig. 3 is a section on the line $x$—$x$ Fig. 1. Fig. 4 is a section on the line $y$—$y$ Fig. 2. Fig. 5 is a side elevation like that shown in Fig. 1 of a modification, the wedge being shown at the back of the tooth.

In the views and referring more particularly to Figs. 1 to 4 inclusive 10 designates the saw body which is provided with a recess to receive the tooth and its securing devices, said recess having tongued edges inclined toward each other as they approach the edge of the saw body. 11 designates the tooth which has a shank with grooved parallel edges. The grooved edge at the back of the tooth fits upon the tongued side of the recess, as shown in said views so as to leave a tapering space between the forward edge of the tooth and the saw body to leave a tapering recess for the tapering wedge 12. The wedge 12 is shown as made shorter than the depth of the recess in which it fits so that it can be moved outward to tighten the tooth or inward to release that member. The base or inner end of the shank of the tooth, at its forward edge and at one side is made with a beveled portion 11$^a$ and at its opposite side with a curved beveled portion 11$^b$. The inner end of the wedge 12 is made with a beveled rearwardly projecting tongue 12$^a$ that rests against the beveled portion 11$^a$. The beveled portion 11$^a$ is made extensive enough longitudinally to permit the wedge to be moved inward or outward. 13 designates a screw threaded into the wedge at a point adapted to have its head bear upon the curved beveled portion 11$^b$ of the tooth. Because said screw is adjustable it can be turned to cause its head to bear upon any point of the beveled portion 11$^b$ opposite to which it can be moved in the normal adjustment of the wedge for tightening or securing the tooth.

In Fig. 5 the wedge 15 is shown as located at the back of the tooth 16 instead of at the front and in such case the other features are changed according to the principles amply illustrated in Figs. 1 to 4.

In practice the wedge is inserted first but to an inner position so as to make room for the insertion of the shank of the tooth. To lock the tooth the wedge is then forced outward until the tooth is tightly held in place and then the screw turned home. To remove a tooth these operations are carried out in reverse order.

What I claim is:

1. In combination with a recessed saw body, a tooth having a shank constructed to engage one edge of said recess, a wedge to engage said shank and the other edge of said recess, and a screw in one of said parts adapted to pinch the wedge and tooth laterally together.

2. In combination with a recessed saw body, a tooth having a shank constructed to engage one edge of said recess, a wedge to engage said shank and the other edge of said recess, said wedge having a tongue to engage one side of the tooth and a screw having a head to engage the opposite side of the tooth.

3. In combination with a recessed saw body, a tooth having a shank constructed to engage one edge of said recess, said tooth provided with beveled portions at opposite sides, a tooth-securing wedge having a tongue to engage one of said beveled portions and a screw having a head to engage the opposite beveled portion of said tooth.

ANDREW KRIEGER.

Witnesses:
BENJAMIN FINCKEL,
OTTO KUECHLER.